United States Patent
Wobak et al.

(10) Patent No.: US 12,250,611 B2
(45) Date of Patent: Mar. 11, 2025

(54) POSITIONING GUIDANCE FOR RFID DEVICES

(71) Applicant: NXP B.V., Eindhoven (NL)

(72) Inventors: Markus Wobak, Graz (AT); Thomas Spiss, Sankt Radegund (AT); Abu Syed Firoz Ismail, Rellingen (DE)

(73) Assignee: NXP B.V., Eindhoven (NL)

(*) Notice: Subject to any disclaimer, the term of this patent is extended or adjusted under 35 U.S.C. 154(b) by 421 days.

(21) Appl. No.: 17/818,162

(22) Filed: Aug. 8, 2022

(65) Prior Publication Data
US 2023/0065694 A1    Mar. 2, 2023

(30) Foreign Application Priority Data
Sep. 2, 2021 (EP) .................................... 21194606

(51) Int. Cl.
*H04W 4/024* (2018.01)
*G06Q 20/32* (2012.01)
(Continued)

(52) U.S. Cl.
CPC ........ *H04W 4/024* (2018.02); *G06Q 20/3224* (2013.01); *G06Q 20/3278* (2013.01); *H04B 17/318* (2015.01); *H04W 4/027* (2013.01)

(58) Field of Classification Search
CPC ....... H04W 4/80; H04W 12/47; H04W 4/027; H04W 4/024; H04W 64/00;
(Continued)

(56) References Cited

U.S. PATENT DOCUMENTS 8,514,081 B2 * 8/2013 Cristache ............. G01S 5/0278
340/572.1
9,198,214 B2 11/2015 Hertel et al.
(Continued)

FOREIGN PATENT DOCUMENTS

CA         2947627 A1 * 12/2015 ......... G07C 9/00309
CN      109194418 A      1/2019
(Continued)

*Primary Examiner* — Olumide Ajibade Akonai
(74) *Attorney, Agent, or Firm* — Dan Hill (57) ABSTRACT

Described is a method for guiding a user for positioning a first RFID-enabled device relative to a second RFID-enabled device for allowing a robust RFID communication between the two RFID-enabled devices. The method includes placing the first RFID-enabled device to a first position relative to the second RFID-enabled device; receiving, by the first RFID-enabled device, when being located at the first position, a first RFID signal transmitted by the second RFID-enabled device; measuring, by the first RFID-enabled device, a first signal strength of the first RFID signal; placing the first RFID-enabled device to a second position relative to the second RFID-enabled device; receiving, by the first RFID-enabled device, when being located at the second position, a second RFID signal transmitted by the second RFID-enabled device; measuring, by the first RFID-enabled device, a second signal strength of the first RFID signal; determining, based on the first signal strength and on the second signal strength, a movement indication for a movement of the first RFID-enabled device towards a target position, at which there is expected a target RF coupling strength between the two RFID-enabled devices, which is stronger than a first RF coupling strength being associated with the first position and a second RF coupling strength being associated with the second position; and (h) providing the determined movement indication to the user of the first RFID-enabled device. In other embodiments, an RFID communication system and device are provided.

20 Claims, 2 Drawing Sheets

(51) Int. Cl.
*H04B 17/318* (2015.01)
*H04W 4/02* (2018.01)

(58) Field of Classification Search
CPC ... H04W 64/003; H04W 4/029; H04W 4/023; H04W 88/02; H04W 4/025; G06Q 20/3278; G06Q 30/0261; G06Q 30/0267; G06Q 20/3224; H04B 17/318; H04B 5/77; H04B 17/27; G01S 13/765; G06K 19/0719; G06K 7/10118; G06K 7/10415; G06K 17/00
See application file for complete search history.

(56) References Cited

U.S. PATENT DOCUMENTS

| | | | |
|---|---|---|---|
| 9,767,329 | B2 | 9/2017 | Forster |
| 9,887,832 | B1 | 2/2018 | Hueber et al. |
| 9,897,682 | B2 | 2/2018 | Altman et al. |
| 10,212,553 | B1 * | 2/2019 | Ambha Madhusudhana ............ H04W 4/026 |
| 10,498,401 | B1 | 12/2019 | Rule et al. |
| 10,721,606 | B2 | 7/2020 | Lee |
| 10,885,514 | B1 | 1/2021 | Hart et al. |
| D917,557 | S | 4/2021 | Cody et al. |
| 2008/0121687 | A1 | 5/2008 | Buhot |
| 2014/0074667 | A1 * | 3/2014 | Smith .................. G06Q 10/087 705/28 |
| 2016/0098690 | A1 * | 4/2016 | Silva .................... G06Q 20/208 705/21 |
| 2016/0105219 | A1 | 4/2016 | Royston et al. |
| 2016/0352391 | A1 * | 12/2016 | Lin ...................... A45C 13/001 |
| 2017/0293740 | A1 | 10/2017 | Xing |
| 2018/0306895 | A1 * | 10/2018 | Nossik ................. G01S 5/0284 |

FOREIGN PATENT DOCUMENTS

| | | |
|---|---|---|
| KR | 20150011870 A | 2/2015 |
| KR | 101501062 B1 | 3/2015 |
| WO | 2019/210466 A1 | 11/2019 |

* cited by examiner

POSITIONING GUIDANCE FOR RFID DEVICES

CROSS-REFERENCE TO RELATED APPLICATIONS

This application claims priority under 35 U.S.C. § 119 to European Patent Application No. 21194606.6, filed on Sep. 2, 2021, the contents of which are incorporated by reference herein.

FIELD OF THE INVENTION

The present invention relates to the technical field of Radio Frequency Identification (RFID) communication between two RFID devices. In particular, the present invention relates (i) to a method for guiding a user for properly positioning first RFID-enabled device relative to a second RFID-enabled device, (ii) to such a first RFID-enabled device, and (iii) to an RFID communication system comprising such a first RFID-enabled device and such a second RFID-enabled device.

BACKGROUND OF THE INVENTION

Modern mobile devices such as cellular phones typically provide an RFID functionality. This means that they can participate in a wireless RFID communication with another RFID enabled device, e. g. an RFID reader or an RFID terminal. Since RFID communication can also take place between a (mobile) RFID enabled card or so called smart card, an operational mode of a mobile device which allows for RFID communication is also called card emulation mode. This mode allows a user of the RFID-enabled mobile device to perform use cases like a contact-less payment, a transit to an otherwise restricted area or a door access. To perform an RFID transaction, the mobile RFID-enabled device has to be positioned in the proximity of a corresponding (RFID-enabled) reader terminal. More specifically, the reader terminal emits an RF field via an antenna and the mobile RFID-enabled device uses another antenna to pickup the magnetic RF field emitted by the reader antenna. Depending on the relative geometric positioning of the mentioned antennas the RF transaction robustness is impacted. In case of a "bad" relative geometric positioning there is only a weak antenna coupling which may cause an insufficient signal to noise ratio for a robust signal decoding. This can lead to failed RF transactions that cause user dissatisfaction.

Typically, it is not obvious for the user of a mobile RFID-enabled device how to position their device with respect to the reader terminal because the antenna location of a mobile RFID-enabled device varies between difference device models and different device vendors. Additionally, most mobile RFID-enabled devices have no antenna marking on its housing such as the backside of the device. Similarly, also reader terminals often have no clear marking of where their antenna is located or where (the antenna of) the respective mobile RFID-enabled device should be placed. As a consequence, finding a good relative geometric position or a good alignment between (i) a mobile RFID-enabled device and (ii) a reader terminal is often not obvious. Hence, RF transactions fail and cause service non-availability and user dissatisfaction.

There may be a need for making an RFID communication between a mobile RFID-enabled device and a RFID-enabled reader terminal reliable.

OBJECT AND SUMMARY OF THE INVENTION

This need may be met by the subject matter according to the independent claims. Advantageous embodiments of the present invention are described by the dependent claims.

According to a first aspect there is provided a method for guiding a user for positioning a first RFID-enabled device relative to a second RFID-enabled device for allowing a robust RFID communication between the two RFID-enabled devices. The provided method comprises (a) placing the first RFID-enabled device to a first position relative to the (stationary) position of the second RFID-enabled device; (b) receiving, by the first RFID-enabled device, when being located at the first position, a first RFID signal transmitted by the second RFID-enabled device; (c) measuring, by the first RFID-enabled device, a first signal strength of the first RFID signal; (d) placing the first RFID-enabled device to a second position relative to the second RFID-enabled device; (e) receiving, by the first RFID-enabled device, when being located at the second position, a second RFID signal transmitted by the second RFID-enabled device; (f) measuring, by the first RFID-enabled device, a second signal strength of the first RFID signal; (g) determining, based on the first signal strength and on the second signal strength, a movement indication for a movement of the first RFID-enabled device towards a target position, at which there is expected a target RF coupling strength between the two RFID-enabled devices, which (target RF coupling strength) is stronger than a first RF coupling strength being associated with the first position and a second RF coupling strength being associated with the second position; and (h) providing the determined movement indication to the user of the first RFID-enabled device.

The described method is based on the idea that measurements of the signal strength of (pilot) RFID signals transmitted by the second RFID-enabled device to the first RFID-enabled device can be used for guiding a user of the first RFID-enabled device to move the first RFID-enabled device to a good RF coupling position of a first antenna of the first RFID-enabled device relative to a (stationary) position of a second antenna of the second RFID-enabled device. In other words, the determined movement indication, when being presented to the user, allows the user to move the first RFID-enabled device to a position wherein a good RF coupling is provided. As a consequence, a high quality and robust RFID communication between the two RFID-enabled devices can be guaranteed. This may allow to successfully execute RF transactions between the user of the first RFID-enabled device and e.g. a vendor operating the second RFID-enabled device.

The described method can be carried out in a certain operational mode of the first RFID-enabled device. In this document this operational mode is called alignment mode. In this mode, the first RFID-enabled device may be continuously monitoring the received signal strength of the RF field emitted by the second RFID-enabled device and may continuously report the received signal strength to an application processor. A suitable application running on the first RFID-enabled device informs the user about the current RF link coupling quality/coupling strength. This can be realized by means of (i) an optical visualization, e.g. on a display of the RFID-enabled device, (ii) an acoustic signal, e.g. generated by a speaker of the first RFID-enabled device or an earphone being coupled with the first RFID-enabled device, (iii) a mechanical signal, e.g. a vibration provided by a vibrator of the first RFID-enabled device, and/or (iv) text information which can be read by the user. In particular the text information may allow to further instruct the user to learn a position of the first RFID-enabled device on or at the second RFID-enabled device, e.g. a reader terminal, allowing for an increased communication robustness also for future RF communication with the particular second RFID-enabled device.

In some applications the RFID signals are Near Field Communication (NFC) signals. In this case of course the RFID correspondingly is an NFC communication and the two devices are NFC-enabled devices. Hence, the described method can be realized in connection with almost any type of (modern) mobile end communication device such as mobile or cellular phones.

For the sake of clarity it is mentioned in accordance with known (RFID) communication standards NFC is based on a set of communication protocols for communication between two electronic devices over a distance of e.g. 4 cm or less. NFC allows for a slow but very easy to realize data communication with simple setup.

According to an embodiment the first RFID-enabled device is a mobile device and the second RFID-enabled device is a terminal or a reader device.

The described mobile device may be any type of communication end device, which, apart from connecting/communicating with the second RFID-enabled device via RFID technology, is capable of connecting/communicating with an arbitrary telecommunication network access point such as a base station, a relay node or a Wireless Local Area Network (WLAN) access point. In particular, the mobile device may be a cellular or mobile phone, a Personal Digital Assistant (PDA), a notebook computer and/or any other movable communication device.

The described terminal or reader device may be any communication device which is capable of triggering nearby RFID-enabled devices by an electromagnetic interrogation pulse and, in response to the triggering, communicating with the respective RFID-enabled device. Apart from communicating with RFID-enabled mobile devices the terminal/reader device may also communication with an active and/or passive Integrated Circuit Card (ICC), also called Smart Card. In this context, an active ICC comprises a battery for powering an integrated chip. A passive ICC "harvests" the energy needed for operating its integrated chip from the energy of the electromagnetic radiation emitted by the terminal/the reader device.

The terminal/reader device may be a stationary device, which may be used for commercial transactions. Thereby, stationary means that it is assigned to a certain location, e.g. a vendor's shop. Of course, within rooms of the vendor the terminal/reader device can be placed at any convenient location.

According to a further embodiment the method further comprises, (after providing the determined movement indication), switching the operational mode of the first RFID-enabled device from a first operational mode to a second operational mode, wherein (i) the first operational mode is a measurement mode which enables the first RFID-enabled device to measure at least the first signal strength and the second signal strength and (ii) the second operational mode is a card emulation mode which enables the first RFID-enabled device to provide the functionality of an Integrated Circuit Card.

In some embodiments, as has already been mentioned above, in the alignment mode the first RFID-enabled device may (continuously) monitor the currently received signal strength of the RF field emitted by the second RFID-enabled device and (continuously) report the currently received signal strength to an application processor for determining the target position as described above.

The described switching may be carried out after the user has moved its first RFID-enabled device towards the mentioned target position. In this context moving the first RFID-enabled device towards the target position means that after the moving the first RFID-enabled device is closer to the target position as before and is coupled "stronger" to the second RFID-enabled device.

According to a further embodiment the method further comprises indicating a current RF coupling strength to the user. This may help the user to get an idea about the expected RFID communication link quality at various positions of its first RFID-enabled device.

According to a further embodiment the switching from the first operational mode to the second operational mode is triggered by the user, whereby in particular the triggering is initiated by a current RF coupling strength being stronger than a predefined RFID coupling strength.

According to a further embodiment the switching from the first operational mode to the second operational mode is carried out automatically when a current RF coupling strength or the current RF coupling strength is stronger than a predefined threshold. This may help to further automatize the ICC emulated RFID communication between the first RFID-enabled device and the second RFID-enabled device.

The predefined threshold may depend on the specific application. Specifically, the predefined threshold may be configurable, e.g. by the user, an operator or the second RFID-enabled device by means of appropriate (RFID) control commands. For instance in environments suffering from strong electromagnetic pollution the predefined threshold may be comparatively high in order to avoid a failure in the RFID communication between the two RFID-enabled devices.

According to a further embodiment the method further comprises, in the second operational mode, exchanging RFID data signals between the first RFID-enabled device and the second RFID-enabled device, wherein the RFID data signals are associated with a transaction. The described commercial transaction may be a commercial transaction, in particular a (wireless) payment process.

The transaction may be triggered by the user request after the user found a good coupling position. The triggering may be realized with pressing a (virtual) button on a screen of the first RFID-enabled device, which button is provided by a (transaction) application running on the first RFID-enabled device. In some first RFID-enabled devices the button is a physical button realized in hardware at a casing of the first RFID-enabled device.

According to a further embodiment, after switching from the first operational mode to the second operational mode, exchanging the RFID data signals is started automatically. This may reduce the user interaction for reliable (commercial) transactions. Hence, a payment process will be particularly easy for the user.

According to a further aspect there is provided a first RFID-enabled device, which comprises (a) a first antenna for receiving RFID signals from a second antenna of a second RFID-enabled device and for transmitting RFID signals to the second antenna; (b) a signal strength sensor, which is coupled to the first antenna and which is configured for measuring a first signal strength of a first RFID signal, which has been transmitted by the second RFID-enabled device when the first RFID-enabled device is located at a first position relative to the second RFID-enabled device and for measuring a second signal strength of a second RFID signal, which has been transmitted by the second RFID-enabled device when the first RFID-enabled device is located at a second position relative to the second RFID-enabled device; (c) a processor, which is coupled to the signal strength sensor and which is configured for determining, based on the first signal strength and on the second signal strength, a movement indication for a movement of the first RFID-enabled device towards a target position, at which there is expected a target RF coupling strength between the two RFID-enabled devices, which is stronger than a first RF coupling strength being associated with the first position and a second RF coupling strength being associated with the second position; and (d) a user interface, which is coupled to the processor and which is configured for providing the determined movement indication to a user of the first RFID-enabled device.

The described first RFID-enabled device is based on the idea that the provided movement indication can guide the user to (manually) position the first RFID-enabled device at the target position or at least towards the target position. This results in a stronger RF coupling between the first antenna and the second antenna. This stronger coupling increases the robustness of (wireless) RFID communication between the two RFID-enabled devices allowing for instance for a reliable/successful commercial transaction.

Descriptively speaking, the user interface of the described first RFID-enabled device provides a feedback to the user about expected positions allowing for a strong or stronger RF coupling strength. This feedback is based on observed RFID signal strength levels which may be so called Received Signal Strength Indicator (RSSI) levels. This may help the user to position the first RFID-enabled device into a sufficiently strong RF field at which a robust RFID communication can be ensured.

According to an embodiment the processor is configured for operating the first RFID-enabled device (i) in a first operational mode, which enables the first RFID-enabled device to measure at least the first signal strength and the second signal strength and which disables the first RFID-enabled device to provide the functionality of an Integrated Circuit Card, and (ii) in a second operational mode, which enables the first RFID-enabled device to provide the functionality of an Integrated Circuit Card.

In some embodiments in the functionality to measure the (first/second) signal strength is disabled in the second operational mode. This may help to save computational and/or electrical power.

The first operational mode may also be (denominated) a "listen-only" operational mode wherein the signal strength sensor (continuously) measures the signal strength of the RFID electromagnetic radiation transmitted by the second RFID-enabled device and the processor (continuously) determines the movement direction.

According to a further embodiment the first RFID-enabled device further comprises an accelerometer sensor, which is coupled to the processor and which is configured for providing acceleration data to the processor, wherein the processor is configured for calculating trajectory information of a movement between the first position and the second position, wherein for determining the movement indication the calculated trajectory information is taken into account. This may improve the reliability and the preciseness of the determined movement indication. Hence, a better guidance of the user for bringing the first RFID-enabled device into an improved magnetic coupling condition can be realized. The acceleration sensor may be in particular a three dimensional (3D) acceleration sensor.

According to a further embodiment the first RFID-enabled device further comprises a non-volatile memory, which has stored at least one configurable signal strength range which is mapped to a device positioning quality.

The information stored in the non-volatile (NV) memory can be used to inform the mobile device user whether the instantaneous position of the first RFID enabled device is a good operating point for a robust RFID communication, or even automatically start an RF transaction in case a configurable threshold for the current RFID signal strength respectively the current RF coupling strength has been reached.

The signal strength mapping may be different between different application environments of the first RFID enabled device. Influencing factors may (a) be an application dependent configuration of an RF modem, which comprises the described signal strength sensor and/or which (inter alia) performs the above described functions of the signal strength sensor, (b) an electric characteristic of an RF matching circuit, and/or (c) impedances of the first antenna and/or the second antenna.

Additionally, the NV memory may store the physical location of the first antenna inside the housing of the first RFID enabled device. This information can be used in a graphical user interface to signal to the user where the active region for RFID communication can be found.

According to a further embodiment the user interface comprises a display. The display may allow to visualize the movement indication and, in some embodiments the current RFID signal strength for the user. This may make it easy for the user to move the first RFID-enabled device to a good RF coupling position.

According to a further embodiment the user interface comprises an acoustic output device and/or a vibrating actuator. This may allow to guide the user for positioning the first RFID-enabled device without requiring a "visual inspection" of the first RFID-enabled device. Hence, during the guidance a potential display of the first RFID-enabled device can be used for other purposes.

The acoustic output device may be a loudspeaker and/or an earphone. The signal strength of the current RFID signal transmitted by the second RFID-enabled device can be indicated with the repetition rate of a beep tone and/or with the tone pitch of an acoustic signal. The vibrating actuator may be an actuator which in modern cellular phones is already present for making the user of the cellular phone attentive in case the loudspeaker is deactivated.

According to a further aspect there is provided a RFID communication system, which comprises (a) a first RFID-enabled device as described above; and (b) the second RFID-enabled device.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this application.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DESCRIPTION OF EMBODIMENTS

The illustration in the drawing is schematical. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

Figure 1:
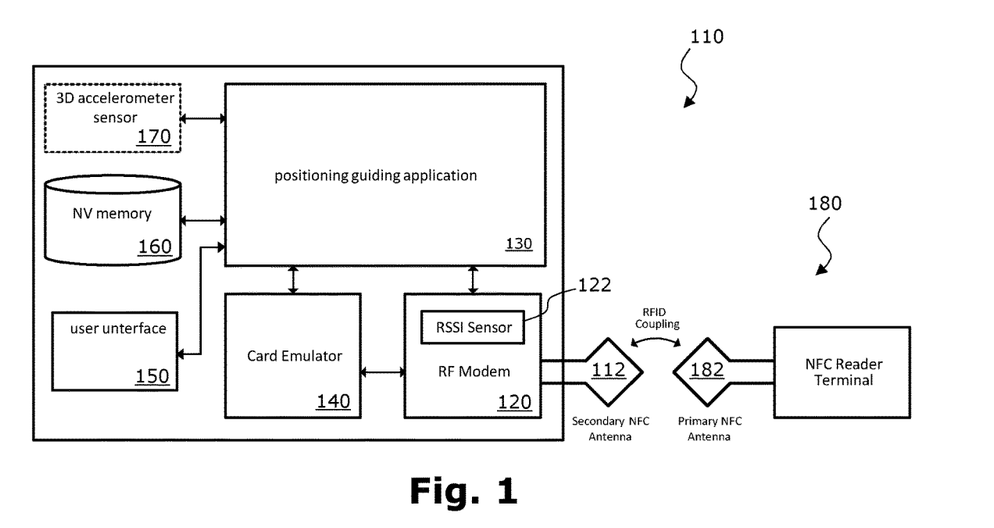
FIG. 1 shows an RFID communication system comprising a cellular phone as a first RFID-enabled device and an RFID reader terminal as a second RFID-enabled device.

FIG. 1 shows an RFID communication system comprising a cellular phone 110 having an NFC functionality as a first RFID-enabled device and an NFC reader terminal as a second RFID-enabled device. The first RFID-enabled device 110 comprises a first antenna 112, the second RFID-enabled device 180 comprises a second antenna 182. Via the two antennas 112, 182 the two RFID-enabled devices 110, 180 are coupled by means of a per se known magnetic RFID coupling. Since a typical RFID communication scenario starts with a (first) RFID signal being emitted by the NFC reader terminal 180 and being received by the cellular phone 110, the second antenna 182 is denominated a primary antenna and the first antenna 112 is denominated a secondary antenna.

As can be taken from FIG. 1, the NFC enabled cellular phone 110 comprises an RF modem 120 being RF connected to the secondary antenna 112. The RF modem 120 comprises a signal strength sensor 122, here a known RSSI sensor, which is described e.g. in the U.S. Pat. No. 9,887,832 B1. The RSSI sensor 122 continuously measures the signal strength of any RF electromagnetic radiation captured by the secondary antenna 112.

As can be further taken from FIG. 1, the NFC enabled cellular phone 110 further comprises a processor 130, a card emulator unit 140, and a user interface 150. The processor 130 is communicatively coupled with both the RF modem 120 and the card emulator unit 140. In order to provide the described NFC functionality, which allows the cellular phone 110 to communicate like an ICC, the card emulator unit 140 is communicatively connected directly with the RF modem 120.

During operation of the NFC enabled cellular phone 110 the processor 130 executes an application which guides a user to position the cellular phone 110 into a location where there is a strong RF coupling between the two antennas 112 and 182. The guiding application 130 is interfacing with the mentioned other subblocks and also performs an interaction with the (not depicted) user of the cellular phone 110. This interaction typically includes a user interface application visualized on a display/screen of the NFC-enabled cellular phone 110. However, also other or additional display options like LEDs or a haptic and/or acoustic feedback can be employed. Further details about this guiding application 130 are presented below.

According to the embodiment described here, the NFC enabled cellular phone 110 further comprises an (optional) non-volatile memory 160 and an (optional) accelerator sensor 170, which are also connected with the processor 130. According to the exemplary embodiment described here the non-volatile memory 160 has stored at least one configurable signal strength range which is mapped to a device positioning quality. The corresponding signal strength information can be used to inform the user whether the instantaneous position of the cellular phone 110 is a good operating point for a robust RFID communication.

The accelerometer sensor provides 3D acceleration data to the processor 130. Based on this acceleration data the processor 130 calculates trajectory information of a movement of the cellular phone 110 between different positions at which there is respectively measured the RFID signal strength. For determining a user indication about a movement (direction) towards a position with a stronger RFID coupling the processor 130 takes into account this trajectory information.

In operation of the RFID communication system, the external NFC reader terminal 180 is generating an RF field emitted by the primary NFC antenna 182, which is magnetically coupled to the secondary NFC antenna 112. Depending on the relative positioning of both RFID enabled devices 110 and 180, the RF modem 120 will receive a stronger or weaker external RF field strength. The RF modem comprises features a sub-unit, which is the above mentioned RSSI sensor 122.

When following the indicated movement (direction) for repositioning the cellular phone 110, the RSSI value captured by the RSSI sensor 122 will increase. If the current RSSI value is above a certain threshold, an RF transaction may be accomplished between the two RFID enabled devices 110 and 180.

According to the exemplary embodiment described here the NFC enabled cellular phone 110 can be operated in two operational modes. A first operational mode is a measurement mode which enables the cellular phone 110 to continuously measure the signal strength of the RF radiation transmitted by the NFC reader terminal 180. Based on these measurements a movement indication is determined and provided to the user which allows the user to bring the cellular phone 110 into a better RFID coupling position with respect to the position of the NFC reader terminal 180. Hence, in this document the first operational mode is also denominated alignment mode.

The second operational mode is a card emulation mode which enables the cellular phone 110 to provide the functionality of an Integrated Circuit Card.

The alignment mode may be started either (I) intentionally by the user e.g. by pressing a button of an application run on the cellular phone 110 or (II) after the RF modem 120 has detected an external RF field having a signal strength which exceeds a configured threshold value stored in the non-volatile memory 160.

Above option (II) may be a selectable configuration in NFC service parameters in the NFC device operating system. Other configurations may include to automatically start a card emulated transaction after detection of an RSSI value above a configurable threshold without additional user interaction.

Figure 2:
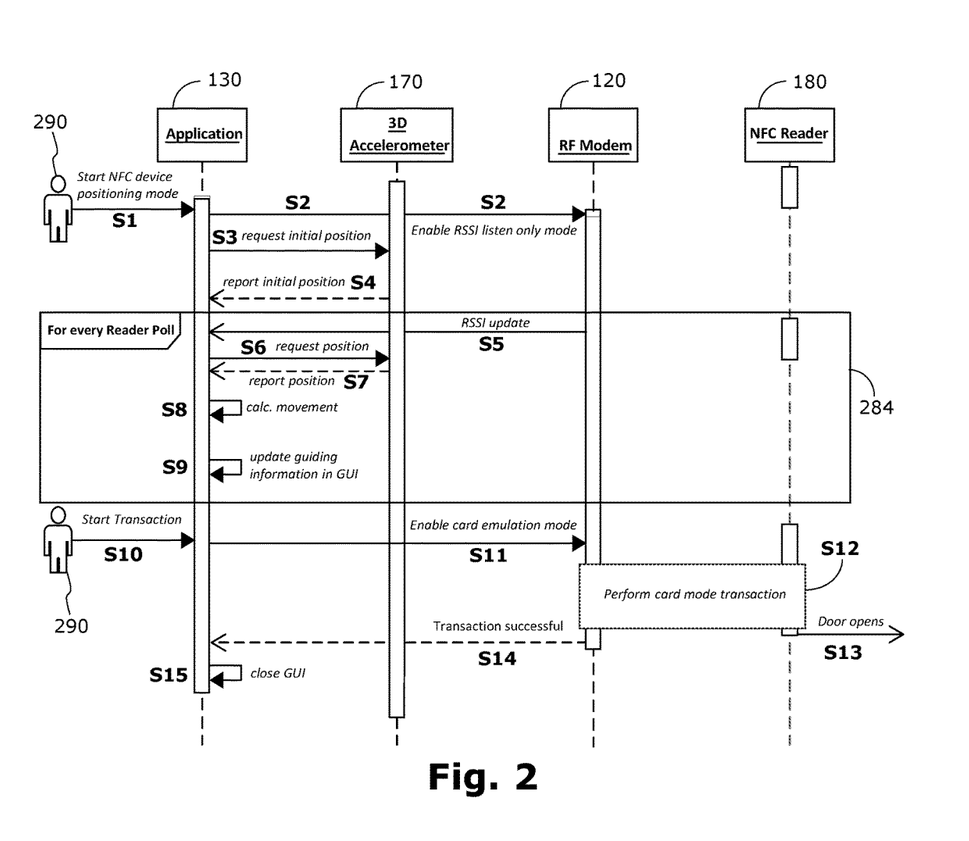
FIG. 2 shows a sequence diagram of messages exchanged between a mobile NFC-enabled device and an NFC reader of a door lock system.

FIG. 2 shows a sequence diagram of messages exchanged between a first RFID-enabled device and an NFC reader of a door lock system. The first RFID-enabled device operates with the known NFC protocol. Hence, in the following, the first RFID-enabled device is also denominated "mobile NFC-enabled device" or simply "mobile NFC device".

The mobile NFC device comprises inter alia the already above elucidated units (i) RF Modem 120, (ii) processor running the guiding application 130, and (iii) 3D accelerator sensor 170. Indicted in FIG. 2 with a block 284 are several messages which are associated with a single one of in reality a plurality of polling actions of the second RFID-enabled device 180. In the following the second RFID-enabled device 180 is also denominated "NFC reader".

According to the exemplary embodiment described here, a user 290 enters the positioning/alignment mode of the mobile NFC device by opening the related application (step S1). This enables an RSSI-listen only mode of the RF Modem 120 (step S2). The application 130 can show a graphical user interface as described in a later section of this document. Additionally, the initial 3D position information is requested by the application 130 from the (internal) accelerator sensor 170 (step S3) and the accelerator sensor 170 reports the initial 3D position information back to the application 130 (step S4). This information will be memorized in a non-depicted memory of the mobile NFC device and will later be used for positioning tracking.

The RF modem 120 will recurringly update the application 130 about detected external RF field's by notifying instantaneous RSSI levels (step S5). The corresponding messages are indicated in FIG. 3 with a message block 284. Hence, according to the exemplary embodiment described here the NFC reader 180 sends only short RF polling sequences. Alternatively, the NFC reader 180 may keep its RF field enabled all the time. Typically, the RF modem 120 may send RSSI updates after detecting an external RF field being enabled or recurringly with a configurable polling timing when an external RF field is present. Depending on the positioning of the NFC device, the RSSI level can increase (e.g. the mobile NFC device is brought to closer proximity of the NFC reader 180), can decrease (e.g. the mobile NFC device is further removed from the NFC reader 180) or can vanish at all (e.g. no RSSI update is given within a configurable timeout time duration or the mobile NFC device was removed from the NFC reader 180). The RSSI strength information can be visualized in a user interface of the mobile NFC device by various methods presented below in this document.

As has already been elucidated above, the RSSI strength information is associated with the expected NFC communication robustness. Hence, the user 290 of the mobile NFC device can also detect if or if not in a current position of the mobile NFC device an external RF field provided by the NFC reader 180 or any other NFC terminal is present.

After any received RSSI updates, the application 130 will request information about the 3D position of the mobile NFC device at the time of the RSSI update from the accelerometer sensor 170 (step S6) and the accelerometer sensor 170 will report the respective position to the application 130 (step S7).

Based on various position information the movement trajectory in space is estimated (step S8). The application 130 can process the combined information of movement trajectory and the RSSI change rate (increase or decrease in value) to estimate the direction of movement in space to position the NFC device for better communication robustness to the NFC reader 180 (e.g. the direction of expected stronger RSSI values). This information is visualized (step S9) in the graphical user interface using e.g. an arrow indicating the proposed mobile NFC device movement direction to increase communication robustness.

The application can also guide the user by showing text information. This allows to instruct the device user further to learn the position of the a mobile NFC device on the NFC reader 180 or on other NFC terminal allowing for an increased communication robustness.

After spatially locating the mobile NFC device in a good NFC communication position on, at, or relative to the NFC reader 180, the user 290 may want to start a transaction. Hence, the user informs the application 130 accordingly e.g. by pressing a button provided by the application 130 within a display of the NFC device (step S10). In response to this request of the user 290 the application 130 enables the above described second operational mode, i.e. the card emulation mode (step S11).

If the RF transaction will be successful, the NFC reader 180 will trigger the associated action (step S12). In this example a door (of a restricted area) will open (step S13). Further, the RF modem 120 of the mobile NFC device notifies the application 130 about the successful transaction (step S14). Furthermore, the application 130 will close the Graphical User Interface (step S15).

It is to be noted that the RF modem 120 may require a minimum RSSI level to perform card mode transactions. This may be needed to ensure sufficient signal to noise ratio operating points for a stable and robust NFC communication. As described above, during the positioning/alignment mode the RF modem 120 does not perform RF communication but monitors only the presence of external RF fields. Thus, during the positioning/alignment mode the RF modem 120 may report RSSI levels above a predefined or a configurable minimum RSSI level. Such a RSSI level report indicates the application 130 that it would be worthwhile to run the card emulation mode for possibly successful transactions.

It is mentioned that in the exemplary embodiment described here the application 130 uses the 3D position information provided by an accelerometer sensor 170 additionally to the mandatory RSSI information provided by the RF modem 120. However, for somebody skilled in the art it is obvious to derive a basic implementation of the positioning guidance described in this document without considering information from the accelerometer sensor 170.

Figure 3A:
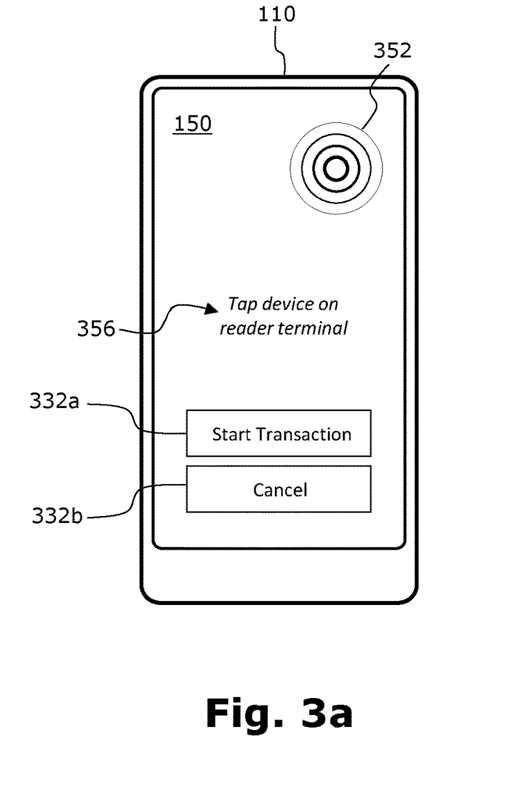
FIGS. 3a and 3b show two examples for a graphical user interface which indicate the user to move the first RFID-enabled device towards a better RFID coupling position.
Figure 3B:
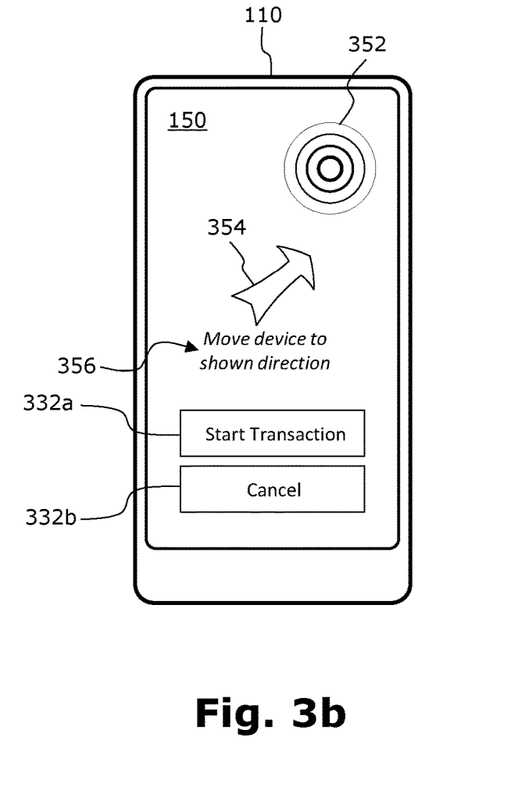

FIGS. 3a and 3b show two examples for a Graphical User Interface (GUI) 150 which indicates the user to move the first RFID-enabled device respectively the mobile NFC device 110 towards a better RFID coupling position. According to the exemplary embodiment described here the GUI is a usual display 150. The (positioning guiding) application is visualizing relevant information to guide a placement of the mobile NFC device 110 close an NFC reader (not depicted in FIG. 3). For this a guiding indicator 352 can be used. According to the exemplary embodiment described here the guiding indicator 352 is shown close to the physical location of the center point of the (secondary) NFC antenna of the mobile NFC device 110. In this respect it is pointed out that the (secondary) NFC antenna is located typically at the backside of the mobile NFC device. In order to improve the positioning accuracy the application is configured with information about the x/y coordinate of the (secondary) NFC antenna to visualize the guiding indicator 352 at the relevant position.

The implementation of the guiding indicator 352 representation may vary. The two examples shown in FIGS. 3a and 3b use a multiplicity of circles around the position of the (secondary) NFC antenna. An increased number of circles may indicate a better coupling to the NFC reader (e.g. associated to an increased RSSI level). In other embodiments, a gauge or bar style indicator is used (additionally) as a guiding indicator. Additionally or alternatively, a color coding may be used to intuitively signal position quality to the user of the mobile NFC device 110. As an example, green may indicate a good position, whereas red coloring may indicate an expected weak coupling such that no robust RF transaction is expected to be possible. Other color coding examples may include coloring the complete device screen or a frame around the screen.

According to the exemplary embodiment described here the GUI 150 features buttons to provide user interaction. A "start transaction" button 332a is provided to leave the above described positioning/alignment mode and to enable the card emulator unit emulator to run the desired NFC transaction after finding a good NFC coupling position. Additionally, according to the exemplary embodiment described here a "cancel" button 332b is provided to leave the positioning/alignment mode without running an NFC transaction.

The mobile NFC device 110 shown in FIG. 3b represents an advanced device being equipped with a 3D accelerometer sensor which provides acceleration data to the application. Here, in addition to before-mentioned positioning information, movement indicator 354 is shown be the application. According to the exemplary embodiment described here the movement indicator 354 is a direction guiding pictogram (like an arrow) which suggests the user to move the mobile NFC device into a certain direction. The direction is proposed based on historic RSSI measurements data combined with detected movement trajectory data. This allows an increased positioning accuracy and a better guiding for the user.

According to the exemplary embodiments described here, the GUI 150 further shows additional information respectively instructions 356 to inform the user what should be done. Alternatively or in combination, the additional information may include information that no RF field is found (e.g. no RSSI value).

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

REFERENCE NUMERALS

110 first RFID enabled device/cellular phone with NFC functionality
112 first antenna/secondary antenna
120 RF modem
122 signal strength sensor/RSSI sensor
130 processor/NFC device positioning guiding application
140 card emulator unit
150 user interface/GUI/display
160 non-volatile memory
170 accelerator sensor
180 second RFID enabled device/NFC reader terminal
182 second antenna/primary antenna
284 polling associated messages
290 user
332a application button/start transaction button
332b application button/cancel transaction button
352 guiding indicator
354 movement direction indicator
356 user instructions

The invention claimed is:

1. A method for guiding a user for positioning a first RFID-enabled device relative to a second RFID-enabled device for allowing a robust RFID communication between the two RFID-enabled devices, the method comprising:
   placing the first RFID-enabled device to a first position relative to the second RFID-enabled device;
   receiving, by the first RFID-enabled device, when being located at the first position, a first RFID signal transmitted by the second RFID-enabled device;
   measuring, by the first RFID-enabled device, a first signal strength of the first RFID signal;
   placing the first RFID-enabled device to a second position relative to the second RFID-enabled device;
   receiving, by the first RFID-enabled device, when being located at the second position, a second RFID signal transmitted by the second RFID-enabled device;
   measuring, by the first RFID-enabled device, a second signal strength of the first RFID signal;
   determining, based on the first signal strength and on the second signal strength, a movement indication for a movement of the first RFID-enabled device towards a target position, at which there is expected a target RF coupling strength between the two RFID-enabled devices, which is stronger than a first RF coupling strength being associated with the first position and a second RF coupling strength being associated with the second position; and
   providing the determined movement indication to the user of the first RFID-enabled device.

2. The method as set forth in the claim 1, wherein the first RFID-enabled device is a mobile device and the second RFID-enabled device is a terminal or a reader device.

3. The method as set forth in claim 1, further comprising:
   switching the operational mode of the first RFID-enabled device from a first operational mode to a second operational mode, wherein the first operational mode is a measurement mode which enables the first RFID-enabled device to measure at least the first signal strength and the second signal strength, and the second operational mode is a card emulation mode which enables the first RFID-enabled device to provide the functionality of an Integrated Circuit Card.

4. The method as set forth in claim 3, further comprising indicating a current RF coupling strength to the user.

5. The method as set forth in claim 3, wherein the switching from the first operational mode to the second operational mode is carried out automatically when a current RF coupling strength or the current RF coupling strength is stronger than a predefined threshold.

6. The method as set forth in claim 3, further comprising, in the second operational mode, exchanging RFID data signals between the first RFID-enabled device and the second RFID-enabled device, wherein the RFID data signals are associated with a transaction, in particular a commercial transaction.

7. The method as set forth in claim 6, wherein after switching from the first operational mode to the second operational mode, exchanging the RFID data signals is started automatically.

8. A first RFID-enabled device, comprising:
a first antenna for receiving RFID signals from a second antenna of a second RFID-enabled device and for transmitting RFID signals to the second antenna;
a signal strength sensor, which is coupled to the first antenna and which is configured for measuring a first signal strength of a first RFID signal, which has been transmitted by the second RFID-enabled device when the first RFID-enabled device is located at a first position relative to the second RFID-enabled device, and measuring a second signal strength of a second RFID signal, which has been transmitted by the second RFID-enabled device when the first RFID-enabled device is located at a second position relative to the second RFID-enabled device;
a processor, which is coupled to the signal strength sensor and which is configured for determining, based on the first signal strength and on the second signal strength, a movement indication for a movement of the first RFID-enabled device towards a target position, at which there is expected a target RF coupling strength between the two RFID-enabled devices, which is stronger than (i) a first RF coupling strength being associated with the first position and (ii) a second RF coupling strength being associated with the second position; and
a user interface, which is coupled to the processor and which is configured for providing the determined movement indication to a user of the first RFID-enabled device.

9. The first RFID-enabled device as set forth in claim 8, wherein the processor is configured for operating the first RFID-enabled device in a first operational mode, which enables the first RFID-enabled device to measure at least the first signal strength and the second signal strength, and which disables the first RFID-enabled device to provide the functionality of an Integrated Circuit Card, and in a second operational mode, which enables the first RFID-enabled device to provide the functionality of an Integrated Circuit Card.

10. The first RFID-enabled device as set forth in claim 8, further comprising an accelerometer sensor, which is coupled to the processor, and which is configured for providing acceleration data to the processor, wherein the processor is configured for calculating trajectory information of a movement between the first position and the second position, wherein for determining the movement indication the calculated trajectory information is taken into account.

11. The first RFID-enabled device as set forth in claim 8, further comprising a non-volatile memory, which has stored at least one configurable signal strength range which is mapped to a device positioning quality.

12. The first RFID-enabled device as set forth in claim 8, wherein the user interface comprises a display.

13. The first RFID-enabled device as set forth in claim 8, wherein the user interface comprises an acoustic output device.

14. The first RFID-enabled device as set forth in claim 8, wherein the user interface comprises a vibrating actuator.

15. An RFID communication system comprising a first RFID-enabled device and a second RFID-enabled device, the first RFID-enabled device comprising:
a first antenna for receiving RFID signals from a second antenna of the second RFID-enabled device and for transmitting RFID signals to the second antenna;
a signal strength sensor, which is coupled to the first antenna and which is configured for measuring a first signal strength of a first RFID signal, which has been transmitted by the second RFID-enabled device when the first RFID-enabled device is located at a first position relative to the second RFID-enabled device and measuring a second signal strength of a second RFID signal, which has been transmitted by the second RFID-enabled device when the first RFID-enabled device is located at a second position relative to the second RFID-enabled device;
a processor, which is coupled to the signal strength sensor and which is configured for determining, based on the first signal strength and on the second signal strength, a movement indication for a movement of the first RFID-enabled device towards a target position, at which there is expected a target RF coupling strength between the two RFID-enabled devices that is stronger than a first RF coupling strength being associated with the first position and a second RF coupling strength being associated with the second position; and
a user interface, which is coupled to the processor and which is configured for providing the determined movement indication to a user of the first RFID-enabled device; and
the second RFID-enabled device.

16. The RFID communication system as set forth in claim 15, wherein the processor is configured for operating the first RFID-enabled device in a first operational mode, which enables the first RFID-enabled device to measure at least the first signal strength and the second signal strength and which disables the first RFID-enabled device to provide the functionality of an Integrated Circuit Card, and in a second operational mode, which enables the first RFID-enabled device to provide the functionality of an Integrated Circuit Card.

17. The RFID communication system as set forth in claim 15, wherein the first RFID-enabled device further comprises an accelerometer sensor, which is coupled to the processor and which is configured for providing acceleration data to the processor, wherein the processor is configured for calculating trajectory information of a movement between the first position and the second position, wherein for determining the movement indication the calculated trajectory information is taken into account.

18. The RFID communication system as set forth in claim 15, wherein the first RFID-enabled device further comprises a non-volatile memory, which has stored at least one configurable signal strength range which is mapped to a device positioning quality.

19. The RFID communication system as set forth in claim 15, wherein the user interface comprises a display.

20. The RFID communication system as set forth in claim 15, wherein the user interface comprises an acoustic output device and/or a vibrating actuator.

* * * * *